United States Patent
Wang et al.

(10) Patent No.: US 10,531,063 B2
(45) Date of Patent: Jan. 7, 2020

(54) METHOD AND APPARATUS FOR PROCESSING STEREOSCOPIC VIDEO

(71) Applicant: Samsung Electronics Co., Ltd., Suwon-si, Gyeonggi-do (KR)

(72) Inventors: Zairan Wang, Beijing (CN); Zhihua Liu, Beijing (CN); Weiming Li, Beijing (CN); YangHo Cho, Seongnam-si (KR); DongKyung Nam, Yongin-si (KR); Mingcai Zhou, Beijing (CN); Tao Hong, Beijing (CN); Haitao Wang, Beijing (CN)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 464 days.

(21) Appl. No.: 15/388,513

(22) Filed: Dec. 22, 2016

(65) Prior Publication Data
US 2017/0188004 A1    Jun. 29, 2017

(30) Foreign Application Priority Data

Dec. 25, 2015  (CN) ........................... 2015 1 0993718
Aug. 24, 2016  (KR) ........................ 10-2016-0107984

(51) Int. Cl.
   *H04N 13/122*  (2018.01)
   *H04N 13/128*  (2018.01)
(52) U.S. Cl.
   CPC ......... *H04N 13/122* (2018.05); *H04N 13/128* (2018.05)

(58) Field of Classification Search
None
See application file for complete search history.

(56) References Cited

U.S. PATENT DOCUMENTS

| 2007/0140593 A1* | 6/2007 | Wang ............... G06T 3/0012 |
| | | 382/298 |
| 2012/0098856 A1 | 4/2012 | Thorpe |
| 2013/0010062 A1 | 1/2013 | Redmann |
| 2014/0002621 A1 | 1/2014 | Uesaka et al. |
| 2014/0240472 A1 | 8/2014 | Hamasaki et al. |
| 2014/0293003 A1* | 10/2014 | Robert ............... H04N 13/183 |
| | | 348/42 |

FOREIGN PATENT DOCUMENTS

| JP | 4823349 B2 | 11/2011 |
| KR | 20130029333 A | 3/2013 |
| KR | 20130108075 A | 10/2013 |
| KR | 20130123611 A | 11/2013 |

* cited by examiner

*Primary Examiner* — David Perlman
(74) *Attorney, Agent, or Firm* — Harness, Dickey & Pierce, P.L.C.

(57) ABSTRACT

A method of processing a stereoscopic video includes determining whether a current frame of a stereoscopic video is a video segment boundary frame; determining whether an image error is included in the current frame when the current frame is the video segment boundary frame; and processing the current frame by removing, from the current frame, a post inserted object (PIO) included in the current frame when the image error is included in the current frame.

20 Claims, 7 Drawing Sheets

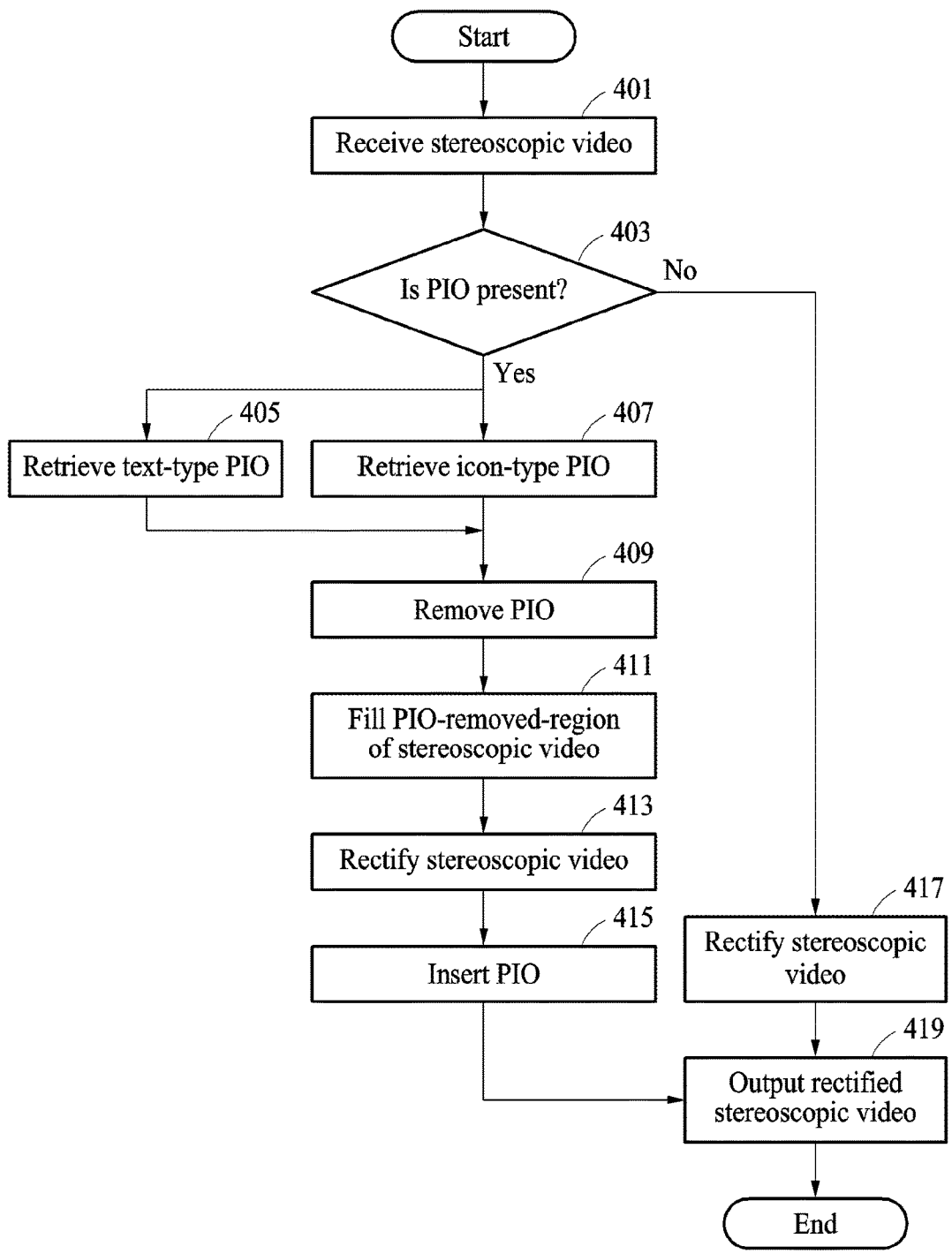

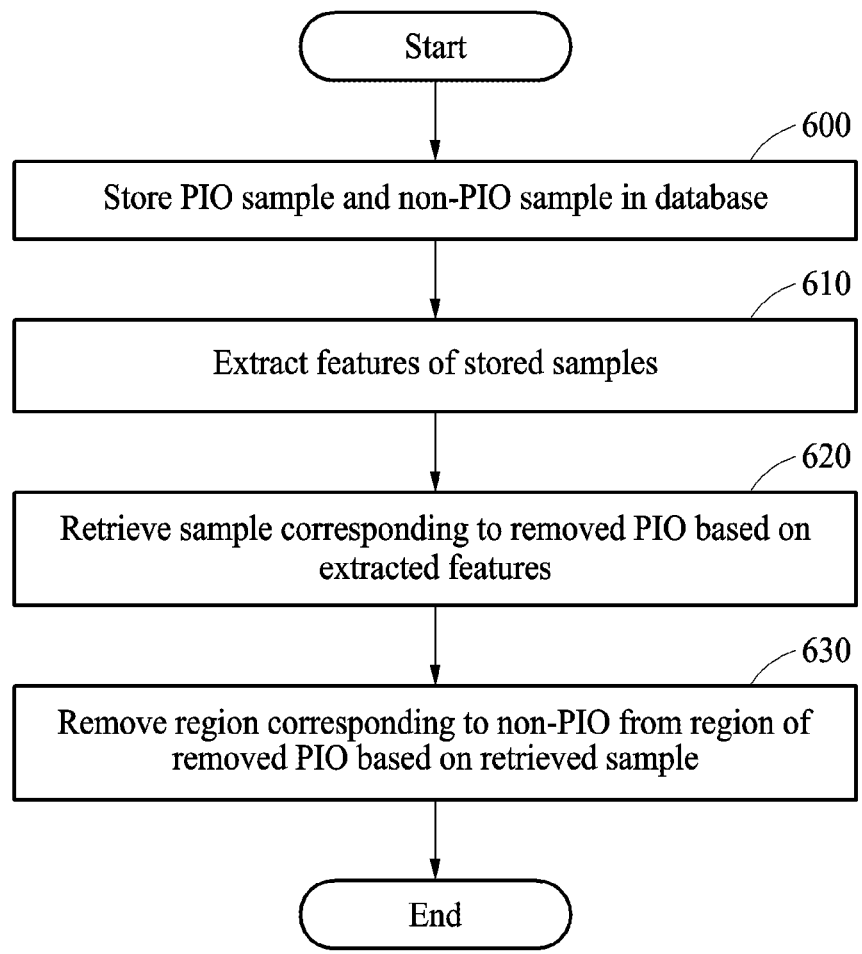

METHOD AND APPARATUS FOR PROCESSING STEREOSCOPIC VIDEO

CROSS-REFERENCE TO RELATED APPLICATION

This application claims under 35 U.S.C. § 119 to Chinese Patent Application No. 201510993718.X filed on Dec. 25, 2015, in the State Intellectual Property Office of the People's Republic of China and Korean Patent Application No. 10-2016-0107984 filed on Aug. 24, 2016 in the Korean Intellectual Property Office, the entire contents of each of which are incorporated herein by reference in their entirety.

BACKGROUND

1. Field

At least one example embodiment relates to a method and apparatus for processing a stereoscopic video.

2. Description of the Related Art

Stereoscopic image technology includes technology for creating stereoscopic image contents and stereoscopic image equipment technology for displaying a stereoscopic image. The stereoscopic image equipment technology for displaying a stereoscopic image includes technology for processing a stereoscopic image. Also, in the stereoscopic image equipment technology, a software processing method may be used to enhance a visual display effect of a three-dimensional (3D) image.

In related arts, technology for rectifying a stereoscopic image may be used to effectively rectify the stereoscopic image. The technology for rectifying a stereoscopic image may be performed to remove a vertical disparity in a stereoscopic image pair. The vertical disparity may occur due to an error in parameter adjustment between two stereoscopic cameras used for capturing a stereoscopic image. The error in parameter adjustment may occur due to a location difference between the two stereoscopic image cameras or non-matching stereoscopic image generating parameters in a stereoscopic image camera. A process of rectifying the stereoscopic image may include an operation of estimating the error and acquiring a conversion parameter of the stereoscopic image and an operation of removing the vertical disparity in the stereoscopic image pair.

In general, stereoscopic image processing may focus on processing a two-dimensional (2D) image captured by a stereoscopic image camera. A 3D object may be captured by two stereoscopic image cameras having different viewpoints, for example, left and right viewpoints. A stereoscopic image pair acquired through the capturing may be located on an epipolar line. Based on a multiview geometry theory, when 2D perspective projection transformation or homography is performed on two stereoscopic images, the two stereoscopic images may be aligned on the epipolar line. Since an optical lens resulting distortion corresponds to a local smoothing, a non-linear distortion error caused by a lens may be rectified through local smoothing transformation.

A post inserted object (PIO) indicates an object additionally added to a stereoscopic image after generation of the stereoscopic image. For example, the PIO may include a broadcast station logo and a subscription. In general, the PIO may be represented at the same horizontal location in a left image and a right image configuring or constituting the stereoscopic image. Since the PIO and the stereoscopic image may be generated at different times, a difference may occur in a stereoscopic geometric relationship therebetween.

Also, when an original image has an error, distortion may occur in a stereoscopic geometric relationship between the PIO and the original image in a process of rectifying the error.

An image error between the left image and the right image of the stereoscopic image may be rectified through overall conversion or the local smoothing transformation. When rectifying the stereoscopic image including the PIO using such rectification method, an error that an appropriate location of the PIO is distorted may occur. Because the PIO is inserted after the generation of the stereoscopic image, a visibility of the stereoscopic image may be higher than that of the original image. Despite the high visibility, when the PIO has the error, a user may experience inconvenience while viewing the stereoscopic image.

SUMMARY

An aspect provides a method and apparatus for processing a stereoscopic video including a post-inserted object (PIO) by rectifying a stereoscopic error of the PIO and an original image in a process of rectifying the stereoscopic image to enhance a quality of the stereoscopic image.

Some example embodiments relate to a method of processing a stereoscopic video.

According to at least some example embodiments, a method of processing a stereoscopic video includes determining whether a current frame of a stereoscopic video is a video segment boundary frame; determining whether an image error is included in the current frame when the current frame is the video segment boundary frame; and processing the current frame by removing, from the current frame, a post inserted object (PIO) included in the current frame when the image error is included in the current frame.

The determining of whether the current frame of the stereoscopic video is the video segment boundary frame may include determining whether the current frame of the stereoscopic video is the video segment boundary frame based on a degree of change in one or more image features between the current frame and a previous frame.

The degree of change in the one or more image features may be determined based on a first feature vector including at least one of a movement, a color, or a brightness of the current frame and a second feature vector of the previous frame.

The determining of whether the image error is included in the current frame may include generating a distribution histogram based on depth map information of a left image and a right image of the current frame; and determining that a stereoscopic disparity is included in the current frame when a peak value of the distribution histogram is greater than a threshold.

The processing may further include rectifying the current frame from which the PIO is removed; and inserting the removed PIO into the rectified current frame.

The removing the PIO from the current frame may include determining a type of the PIO included in the current frame; and setting an edge of the PIO in the stereoscopic video based on the determined type.

The inserting the removed PIO into the rectified current frame may include inserting the PIO at an original location of the PIO in the current frame from which the PIO was removed.

The processing may further include filling a region from which the PIO is removed in the current frame.

The filling of the region from which the PIO is removed in the current frame may include performing traverse-processing on a pixel included in the region based on a color value of a pixel not included in the region among pixels located around the region.

According to at least some example embodiments, a method of processing a stereoscopic video may include determining whether a post-inserted object (PIO) is present in a current frame of a stereoscopic video; removing the PIO from the current frame when the PIO is present in the current frame; rectifying the current frame from which the PIO is removed; and inserting the removed PIO into the rectified current frame.

The determining of whether the PIO is present in the current frame of the stereoscopic video may be performed when the current frame is a video segment boundary frame and an image error is included in the current frame.

The removing the PIO from the current frame when the PIO is determined to be present in the current frame may include determining a type of the PIO present in the current frame; and setting a boundary of the PIO in the current frame based on the determined type.

The removing the PIO from the current frame when the PIO is determined to be present in the current frame may include determining whether the PIO determined to be present in the current frame is a text-type PIO by performing X-directional and Y-directional projection analysis on the current frame; and when the PIO determined to be present in the current frame is determined to be a text-type PIO, measuring a depth of the PIO determined to be present in the current frame; removing the PIO determined to be present in the current frame based on the measured depth, when the PIO determined to be present in the current frame is not included in a foreground; extracting a color of a remaining text-type PIO based on a color distribution histogram of the current frame; and removing the remaining text-type PIO based on the extracted color.

The determining whether the PIO determined to be present in the current frame is a text-type PIO by performing X-directional and Y-directional projection analysis on the current frame may include calculating an edge strength value of the PIO determined to be present in the current frame; setting the calculated edge strength value to be zero when the calculated edge strength value is less than a threshold; and determining a location of the PIO determined to be present in the current frame based on the set edge strength value.

The determining whether the PIO determined to be present in the current frame is a text-type PIO by performing X-directional and Y-directional projection analysis on the current frame may include extracting a cut-off edge of the PIO determined to be present in the current frame; calculating a horizontal projection value and a vertical projection value of the extracted cut-off edge; acquiring upper and lower boundaries of the PIO determined to be present in the current frame based on the calculated horizontal projection value; acquiring left and right boundaries of the PIO determined to be present in the current frame based on the calculated vertical projection value; and adjusting a location of the PIO determined to be present in the current frame based on the upper and lower boundaries and the left and right boundaries.

The method may further include, when the PIO determined to be present in the current frame is determined to be a text-type PIO, determining what type of text-type PIO the PIO determined to be present in the current frame is based on features of samples extracted from a plurality of text-type PIO samples and a plurality of non-text PIO samples; and removing a region corresponding to a non-text PIO included in the PIO determined to be present in the current frame based on the determined type of text-type PIO.

The rectifying of the current frame from which the PIO is removed may include filling a region from which the PIO is removed in the current frame.

The filling of the region from which the PIO is removed in the current frame may include performing traverse-processing on a pixel included in the region based on a color value of a pixel not included in the region among pixels located around the region.

The inserting the removed PIO into the rectified current frame may include inserting the PIO at an original location of the PIO in the current frame from which the PIO is removed.

According to at least some example embodiments, an apparatus for processing a stereoscopic video may include memory storing computer-executable instructions; and one or more processors configured to execute the computer-executable instructions such that the one or more processors are configured to determine whether a post inserted object (PIO) is present in a current frame of a stereoscopic video and remove the PIO from the current frame when the PIO is determined to be present in the current frame; rectify the current frame from which the PIO is removed; and insert the removed PIO into the rectified current frame.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

FIG. 4 illustrates another example of a stereoscopic video processing method according to at least one example embodiment;

FIG. 6 illustrates an example of verification performed on a PIO in a current frame according to at least one example embodiment.

DETAILED DESCRIPTION

Figure 1:
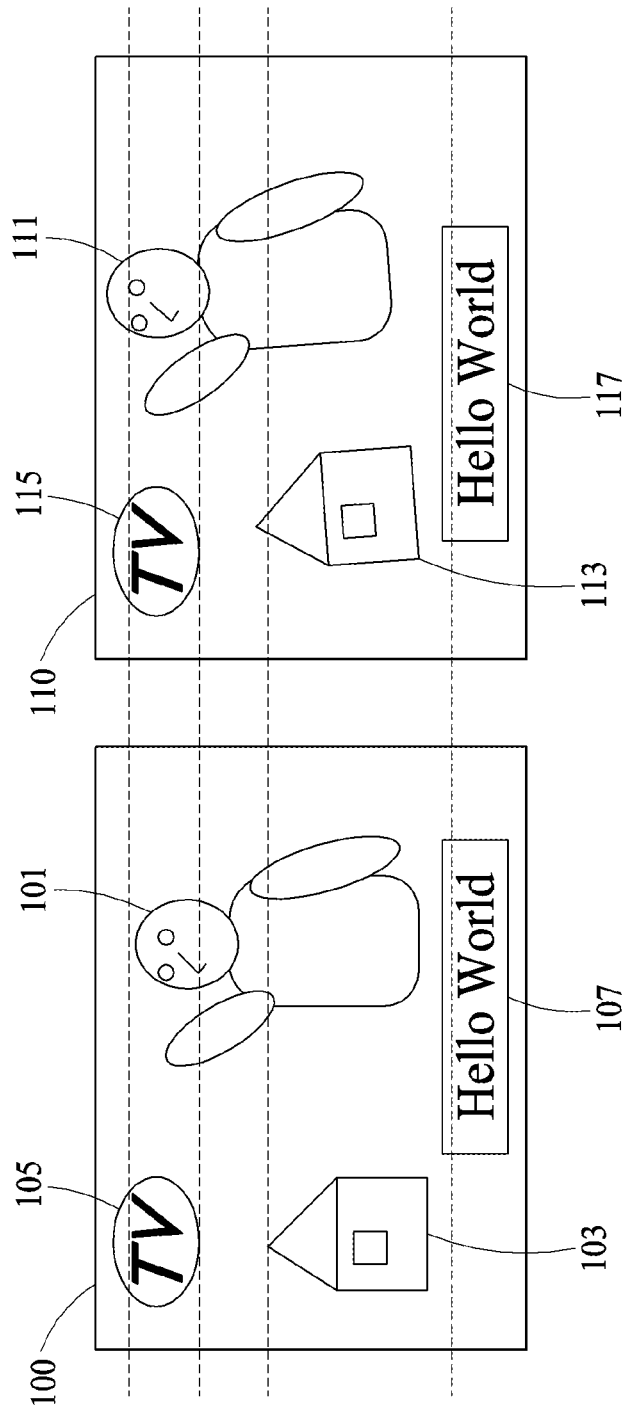
FIG. 1 illustrates an example of a left image and a right image configuring or constituting a frame of a stereoscopic video according to at least one example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

FIG. 1 illustrates an example of a left image and a right image configuring or constituting a frame of a stereoscopic video according to at least one example embodiment. A frame of a stereoscopic video may include a left image 100 and a right image 110. An object 101 and an object 103 of the left image 100 and an object 111 and an object 113 of the right image 110 may be objects in a scene corresponding to a target of the stereoscopic video. Ideally, objects in the left image 100 and the right image 110 may be aligned on the same horizontal line. In practice, an error may occur in a process of capturing the stereoscopic video and thus, the objects 101, 103, 111, and 113 of the left image 100 and the right image 110 may not be aligned on the same horizontal line as illustrated in FIG. 1.

In a process of editing the stereoscopic video after the capturing, a post inserted object (PIO) may be added to the stereoscopic video. The PIO may include, for example, a broadcast station logo and a subscription to be inserted to an image. In an example of FIG. 1, an object 105 of the left image 100 and an object 115 of the right image 110 may be the broadcast station logo and an object 107 of the left image 100 and an object 117 of the right image 110 may be the subscription. Accordingly, objects 105, 107, 115, and 117 may each be an example of a PIO. Since the PIO is an element added after the stereoscopic video is captured, the PIO may be inserted to mutually corresponding locations in the left image 100 and the right image 110 corresponding to each other. For example, the PIO may be located on the same horizontal line in the left image 100 and the right image 110.

As illustrated in FIG. 1, an image error may occur between elements, for example, the left image 100 and the right image 110 of the frame of the stereoscopic video. The image error may indicate an error between a left image and a right image configuring or constituting a frame. For example, in the left image 100 and the right image 110, the objects 101 and 111 are not aligned on the same horizontal line. Similarly, the objects 103 and 113 are not aligned on the same horizontal line. As such, the image error may indicate that locations or sizes of mutually corresponding objects are differently represented in the left image and the right image configuring or constituting the frame of the stereoscopic video.

The image error may be rectified using the following methods: a method of identically rectifying all elements included in the left image and the right image and a local smoothing transformation method of smoothing a portion of elements in the left image and the right image.

The left image 100 and the right image 110 may include the image error between elements corresponding to each other. For example, the object 101 of the left image 100 and the object 111 of the right image 110 corresponding to each other may not be aligned on a horizontal line. Similarly, the object 103 of the left image 100 and the object 113 of the right image 110 corresponding to each other may not be aligned on a horizontal line. To rectify such an image error, the objects 111, 113, 115, and 117 of the right image 110 may be uniformly rectified using an identical method.

An example of rectifying all elements of the right image using an identical method will be described in detail with reference to FIG. 2.

Figure 2:
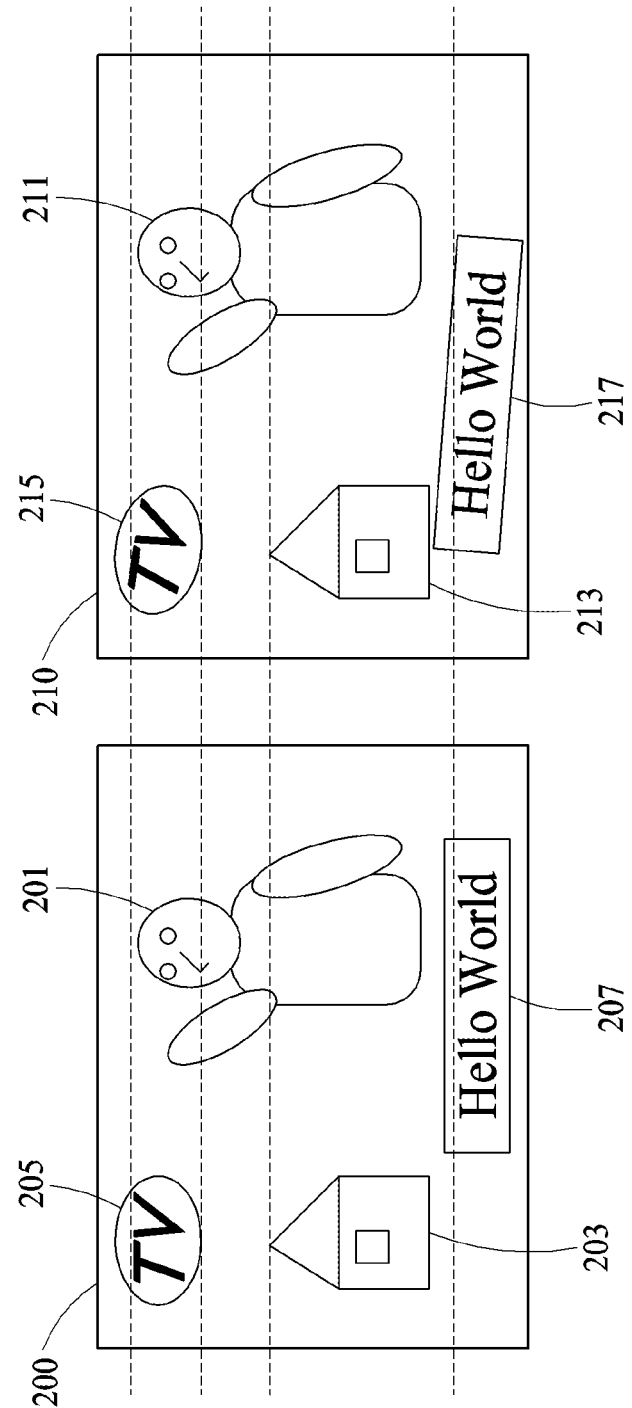
FIG. 2 illustrates an example of rectifying an image error in the stereoscopic video of FIG. 1 according to at least one example embodiment.

FIG. 2 illustrates an example of rectifying an image error in the stereoscopic video of FIG. 1 according to at least one example embodiment.

To rectify an image error between a left image and a right image configuring or constituting a frame of a stereoscopic video, elements including an object and a PIO of the right image may be uniformly rectified based on an object of the left image. For example, the objects 111, 113, 115, and 117 of the right image 110 may be uniformly rectified to rectify horizontal locations and/or orientations of the objects 111 and 113 of the right image 110 based on the objects 101 and 103 of the left image 100. In FIG. 2, a right image 210 represents a result of uniform rectification performed on the elements of the right image 110.

As a result of uniform rectification performed on the elements of the right image 110, an object 201 of a left image 200 and an object 211 of the right image 210 may be aligned on a horizontal line and an object 203 of the left image 200 and an object 213 of the right image 210 may also be aligned on a horizontal line. However, after the uniform rectification is performed to remove the image error between the left image 200 and the right image 210, an image error may occur for PIO 215 and a PIO 217 in the right image 210. For example, an image error may occur between PIO 215 of the right image and a PIO 205 of the left image, and an image error may occur between PIO 217 of the right image and a PIO 207 of the left image.

Figure 3A:
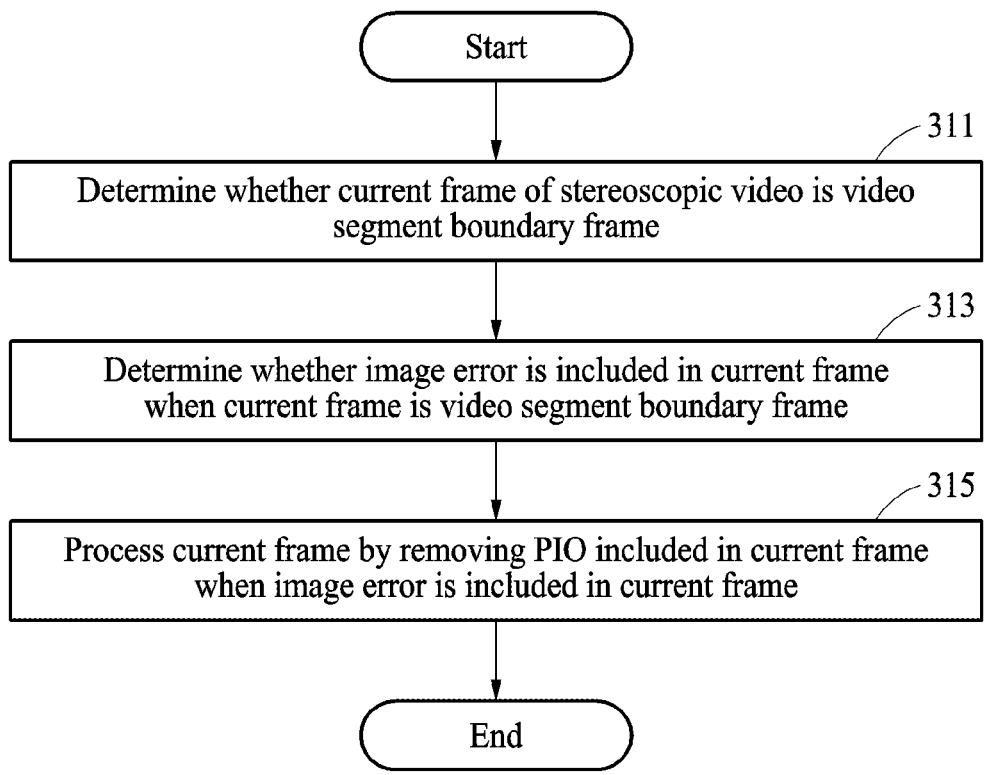
FIG. 3A illustrates an example of a stereoscopic video processing method according to at least one example embodiment.

FIG. 3A illustrates an example of a stereoscopic video processing method according to at least one example embodiment.

A stereoscopic video processing method may include an operation 311 of determining whether a current frame of a stereoscopic video is a video segment boundary frame, an operation 313 of determining whether an image error is included in the current frame when the current frame is the video segment boundary frame, and an operation 315 of processing the current frame by removing a PIO included in the current frame when the image error is included in the current frame.

In operation 311, the stereoscopic video processing method may determine whether the current frame of the stereoscopic video is the video segment boundary frame. In detail, the stereoscopic video processing method may determine whether the current frame of the stereoscopic video is the video segment boundary frame based on a degree of change in one or more image features between the current frame and a previous frame. The degree of change in the one or more image features may be determined based on a first feature vector including at least one of a movement, a color, or a brightness of the current frame and a second feature vector of the previous frame. As a determination result, when the current frame corresponds to the video segment boundary frame, whether the image error is included in the current frame of the stereoscopic video may be determined.

When the current frame of the stereoscopic video is not the video segment boundary frame, a stereoscopic image of the current frame may be processed using the same processing method as that of a previous frame of the current frame.

Using such method, whether the image error is present may not need to be determined for every stereoscopic image in a video frame and thus, an operation time may be reduced.

Determination of whether the current frame including the stereoscopic image is the video segment boundary frame may be performed by determining whether a currently processed image frame is located at a boundary between two segments capturing different scenes. An image error between a left image and a right image configuring or constituting a stereoscopic video may occur for each video segment. As such, an operation of determining whether an image error is included in a stereoscopic video may be performed once for each video segment and thus, a time used for processing the stereoscopic video may be reduced.

In operation 313, when the current frame of the stereoscopic video is the video segment boundary frame, the stereoscopic video processing method may determine whether the image error is included in the current frame. Determination of whether the image error is included in the current frame may be performed as described below.

Feature points may be extracted from the left image and the right image configuring or constituting the current frame of the stereoscopic video. The feature points may be, for example, meaningful elements in a minimum or, alternatively, relatively small unit among elements included in the left image and the right image. Also, a feature vector may be generated for each of the feature point of the left image and the feature point of the right image. Based on a similarity between the feature vector of the left image and the feature vector of the right image, the feature point of the left image may be matched to the feature point of the right image. When each of the left image and the right image includes a plurality of feature points, a plurality of a feature vectors may be generated. And the feature points of the left image may be matched to the feature points of the right image based on a similarity between the feature vectors of the left image and the feature vectors of the right image. A sum of vertical depth values acquired from the matched feature points of the left image and the right image may be obtained to generate a distribution histogram associated with the vertical depth values. When a peak value of the generated distribution histogram is greater than a preset threshold, it is determined that the image error is included in the current frame. When the peak value of the generated distribution histogram is less than or equal to the threshold, it is determined that the image error is not included in the current frame.

In operation 315, when the image error is included in the current frame, the stereoscopic video processing method may process the current frame by removing the PIO included in the current frame.

The image error included in the current frame may indicate that a target object of a stereoscopic video is not aligned on the same horizontal line in a left image and a right image configuring or constituting the stereoscopic video. To rectify the image error, a location of the target object in one of the left image and the right image may be adjusted relative to a location of the target object in the remaining image. For example, a location of an object in the right image may be adjusted such that the object of the right image and a corresponding object of the left image are aligned on the same horizontal line.

In at least the example illustrated in FIG. 3A, among objects included in the right image, elements that are not to be aligned may be excluded from a process of rectification. Thus, when it is determined that the current frame has the image error, elements not to be aligned among elements included in the current frame may be removed from the current frame. When rectifying locations of the elements in the right image relative to locations of the corresponding elements in the left image, whether elements not to be rectified are included in the elements of the right image may be determined. Since a PIO of the right image is an object inserted after the stereoscopic video is captured, it may be unnecessary to perform rectification on the PIO with respect to the objects included in the right image. In at least the example illustrated in FIG. 3A, the stereoscopic video processing method may include an operation of removing the PIO from the right image.

Figure 3B:
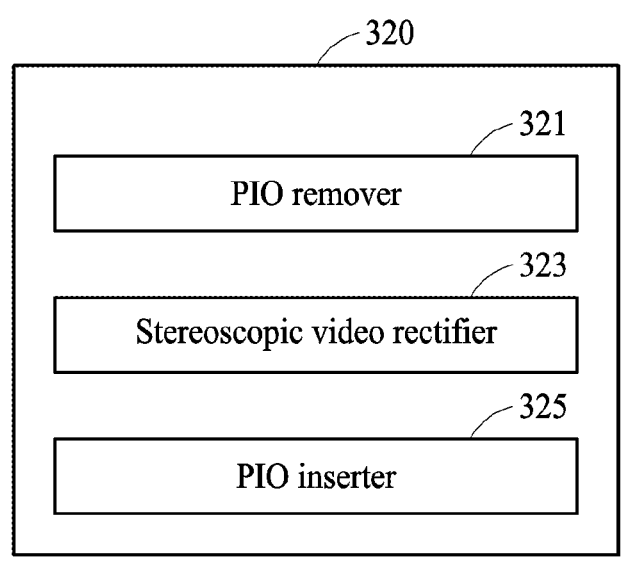
FIG. 3B illustrates an example of a stereoscopic video processing apparatus according to at least one example embodiment.

FIG. 3B illustrates an example of a stereoscopic video processing apparatus according to at least one example embodiment.

A stereoscopic video processing apparatus 320 may include a PIO remover 321 configured to determine whether a PIO is present in the current frame of the stereoscopic video and remove the PIO from the current frame when the PIO is present in the current frame, a stereoscopic video rectifier 323 configured to rectify the current frame from which the PIO is removed, and a PIO inserter 325 configured to insert the PIO into the rectified current frame.

According to at least one example embodiment, the stereoscopic video processing apparatus 320 may include or be implemented by one or more circuits or circuitry (e.g., hardware) specifically structured to carry out and/or control some or all of the operations described in the present disclosure as being performed by the stereoscopic video processing apparatus 320 (or an element thereof) and some or all of the operations described with respect to FIGS. 3A and 4-6. According to at least one example embodiment, the stereoscopic video processing apparatus 320 may include or be implemented by a memory and one or more processors executing computer-readable code (e.g., software and/or firmware) that is stored in the memory and includes instructions for causing the one or more processors to carry out and/or control some or all of the operations described herein as being performed by the stereoscopic video processing apparatus 320 (or an element thereof) and some or all of the operations described with respect to FIGS. 3A and 4-6. According to at least one example embodiment, the stereoscopic video processing apparatus 320 may be implemented by, for example, a combination of the above-referenced hardware and processors executing computer-readable code.

A stereoscopic video processing method and apparatus according to example embodiments may be used, for example, to process a still stereoscopic image in a stationary state. The stereoscopic video processing method and apparatus according to example embodiments may also be used, for example, to process a dynamic stereoscopic image. A procedure of processing the stereoscopic video may be performed on each frame included in the stereoscopic video. Also, the stereoscopic video processing method and apparatus may be used to process at least one of a left image and a right image configuring or constituting a frame of the stereoscopic video.

FIG. 4 illustrates another example of a stereoscopic video processing method according to at least one example embodiment.

In operation 401, the stereoscopic video processing method may receive a stereoscopic video. In the stereoscopic video processing method, whether rectification is to be performed on a current frame of the input stereoscopic video may be determined and the rectification may be performed in response thereto. Thus, whether the stereoscopic video is input may be determined in the stereoscopic video processing method.

In operation 403, the stereoscopic video processing method may determine whether a PIO is present in the current frame of the input stereoscopic video. The PIO may indicate an object additionally inserted to the stereoscopic video after the stereoscopic video is captured. The PIO may include, for example, a broadcast station logo or a subscription additionally inserted to the stereoscopic video.

In operation 405, the stereoscopic video processing method may retrieve a text-type PIO in the current frame of the stereoscopic video. For example, when a subscription inserted after capturing the stereoscopic video is present, it is determined that the text-type PIO is present in the current frame of the stereoscopic video. According to at least some example embodiments, retrieving the text-type PIO refers to identifying the text-type PIO in the received stereoscopic video.

In operation 407, the stereoscopic video processing method may retrieve an icon-type PIO in the current frame of the stereoscopic video. For example, when a broadcast station logo inserted after capturing the stereoscopic video is present, it is determined that the icon-type PIO is present in the current frame of the stereoscopic video. The icon-type PIO may include contents in a form of, for example, a picture, a drawing, and an icon. According to at least some example embodiments, retrieving the icon-type PIO refers to identifying the icon-type PIO in the received stereoscopic video.

In operation 409, the stereoscopic video processing method may remove the PIO included in the current frame of the stereoscopic video. For example, when the text-type PIO is present in the current frame, a boundary of the text-type PIO may be set. The boundary may be set in units of a character, a sentence, or a paragraph based on a form and a type of the text-type PIO included in the current frame. Based on the set boundary, the text-type PIO may be removed from the current frame. When the icon-type PIO is present in the current frame, the boundary of the icon-type PIO may be set and the icon-type PIO may be removed from the current frame based on the set boundary.

In operation 411, the stereoscopic video processing method may fill a region from which the PIO is removed in the current frame of the stereoscopic video. When the PIO is removed from the current frame, the region may be represented as, for example, a black or white blank. The region may be partially or fully filled using a color of a pixel located around the region. When an original stereoscopic video is present, the region may be filled based on the original stereoscopic video. The original stereoscopic video may be, for example, a stereoscopic video to which the PIO has not been added.

In one example, the region from which the PIO is removed may be partially filled. For example, a desired or, alternatively, predetermined portion from the boundary of the region toward a center of the region may be filled. Also, the boundary of the region may be blurred to reduce a size of the region represented as a blank.

In operation 413, the stereoscopic video processing method may rectify the current frame from which the PIO is removed in the stereoscopic video. For example, the current frame from which the PIO is removed may include an image error. The image error of the current frame may be rectified by correcting at least one of a left image and a right image included in the current frame and aligning elements of the left image and the right image on the same horizontal line. Since the PIO is removed in operation 409, a target of rectification performed in operation 411 may be objects included in the original stereoscopic video.

In operation 415, the stereoscopic video processing method may insert the PIO to the rectified current frame. The PIO removed from the current frame may be inserted to the current frame after the image error of the current frame is rectified. A location to which the PIO is inserted in the rectified current frame may be the same as a location from which the PIO is removed before the rectification.

In operation 417, the stereoscopic video processing method may rectify the stereoscopic video when the PIO is absent in the current frame of the stereoscopic video. Since the PIO is absent in the current frame, rectification may be performed on the image error of the current frame directly irrespective of the PIO.

In operation 419, the stereoscopic video processing method may output the rectified stereoscopic video. When the rectification is performed on the stereoscopic video including the PIO or the stereoscopic video not including the PIO, the rectified stereoscopic video may be output to a user.

The aforementioned method of processing the current frame of the stereoscopic video may include at least one of operations 401 through 419. The method of processing the current frame of the stereoscopic video may also be performed not through any one of operations 401 to 419.

Figure 5:
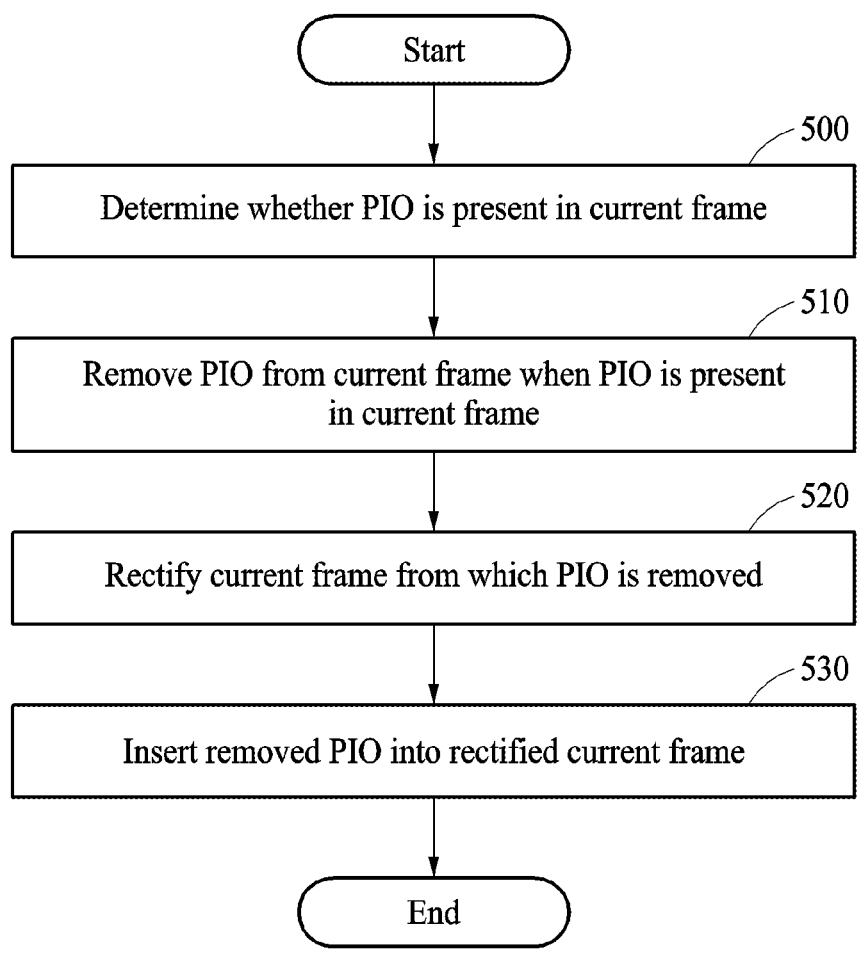
FIG. 5 illustrates an example of a method of processing a post inserted object (PIO) in a current frame according to at least one example embodiment.

FIG. 5 illustrates an example of a method of processing a PIO in a current frame according to at least one example embodiment.

In operation 500, whether a PIO is present in a current frame of an input stereoscopic video may be determined. In this example, whether an image error is present in the current frame of the stereoscopic video may be determined in advance to determination of whether the PIO is present in the current frame. In contrast, when the image error is absent in the current frame, determination of whether the PIO is present may not be performed.

In operation 510, when the PIO is present in the current frame of the stereoscopic video, the PIO may be removed from the current frame. In this example, a type of the PIO may be determined in advance to a removal of the PIO. Whether the PIO determined to be present in the current frame is a text-type PIO may be determined by performing X-directional and Y-directional projection analysis on the current frame. In detail, A method of calculating an edge strength value of the PIO determined to be present in the current frame and setting the calculated edge strength value to be zero when the calculated edge strength value is less than a threshold and determining a location of the PIO determined to be present in the current frame based on the set edge strength value may be applied. A method of extracting a cut-off edge of the PIO determined to be present in the current frame and calculating a horizontal projection value and a vertical projection value of the extracted cut-off edge and acquiring upper and lower boundaries of the PIO determined to be present in the current frame based on the calculated horizontal projection value and acquiring left and right boundaries of the PIO determined to be present in the current frame based on the calculated vertical projection value and adjusting a location of the PIO determined to be present in the current frame based on the upper and lower boundaries and the left and right boundaries may be applied.

Information associated with the type of the PIO may be previously stored by a user. The type of the PIO may include a text type such as a subscription and an icon type such as a logo or a picture. The removal of the PIO may be performed using various methods based on the determined type. For example, when the PIO determined to be present in the current frame is determined to be a text-type PIO, a method of measuring a depth of the PIO determined to be present in the current frame and removing the PIO determined to be present in the current frame based on the measured depth may be applied. For example, when the PIO determined to be present in the current frame is not included in a foreground, a method of extracting a color of a remaining text-type PIO based on a color distribution histogram of the current frame and removing the remaining text-type PIO based on the extracted color may be applied. For example, when the PIO determined to be present in the current frame is determined to be a text-type PIO, A method of determining what type of text-type PIO the PIO determined to be present in the current frame is based on features of samples extracted from a plurality of text-type PIO samples and a plurality of non-text PIO samples and removing a region corresponding to a non-text PIO included in the PIO determined to be present in the current frame based on the determined type of text-type PIO may be applied. For example, when the PIO is the subscription, a method of separating the subscription into characters and extracting the characters may be applied. An operation of setting a boundary of the PIO may be additionally performed based on the determined type and the PIO may be removed based on the set boundary.

In operation 520, the current frame from which the PIO is removed may be rectified. In this example, since the PIO is separated and removed from the current frame, a region from which the PIO is removed may be represented as, for example a black or white blank. The region may be filled based on information on a pixel located around the region. For example, the region may be filled using a method of performing traverse processing on a pixel included in the region based on a color value of the pixel located around the region.

In operation 530, the removed PIO may be inserted to the rectified current frame. In at least the example shown in FIG. 5, the removed PIO may be input to a location the same as an original location at which the PIO is initially input to the current frame of the stereoscopic video.

FIG. 6 illustrates an example of verification on a PIO in a current frame according to at least one example embodiment.

When a PIO is present in a current frame, the PIO may be removed from the current frame. Subsequently, whether the PIO is appropriately removed from the current frame may be verified. An element, for example, a leaf and a wall in a scene of the stereoscopic video may be recognized (erroneously, in at least some cases) to be the PIO in lieu of a text-type PIO and an icon-type PIO. To solve this, an operation of performing the verification on the removed PIO may be performed additionally.

In operation 600, a PIO sample and a non-PIO sample may be stored. The PIO sample and the non-PIO sample may also be referred to as, for example, a positive example and a counterexample, respectively. For example, the PIO sample and the non-PIO sample may be previously stored in a database (e.g., a database included in, or accessible by, the stereoscopic video processing apparatus 320). Also, the PIO sample and the non-PIO sample may be stored by collecting samples through online in real time.

In operation 610, features of a plurality of stored samples may be extracted. In operation 620, retrieval for a sample corresponding to a removed PIO may be performed by applying an offline learning algorithm based on the extracted features. The sample acquired through the retrieval may be used to determine a type of the removed PIO.

In operation 630, a region corresponding to a non-PIO may be removed from a region of the removed PIO based on information associated with the determined type included in, for example, the retrieved sample. Through this, the PIO may be removed accurately. The features of the samples may include, for example, a scale-invariant feature transform (SIFT) feature and a histogram of oriented gradient (HOG) feature.

A support vector machine (SVM) classifier may be used to classify the type of the PIO using the samples in an example.

A method and apparatus for processing a current frame of a stereoscopic video may be applied to a stereoscopic video display device. The example embodiments described herein may be applicable to, for example, display devices including, but not limited to, a 3D smart TV, a smartphone, a TV, and a display having a large size screen.

The example embodiments may also be applicable to a 3D display device with glasses and a glasses-free 3D display device. Various modules of the present disclosure may be combined in a single processor. The modules may be provided independently of one another. Also, at least two of the modules may be provided as a combination. The modules may be implemented by one or more software modules, one or more hardware modules, or various combinations thereof. The modules may be located in a single terminal or a network node, and also be distributed in a plurality of terminals or network nodes.

According to an aspect, it is possible to extract a PIO included in a stereoscopic image and adjust a location of the PIO.

According to another aspect, it is possible to enhance a quality of a stereoscopic image by arranging a PIO and the stereoscopic image to correspond to a standard stereoscopic geometric relationship and correcting an error in a process of rectifying the stereoscopic image.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. According to at least some example embodiments, the program instructions recorded on the media may be those specially designed and constructed for the purposes of example embodiments. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A method of processing a stereoscopic video, the method comprising:
   determining whether a current frame of a stereoscopic video is a video segment boundary frame;
   determining whether an image error is included in the current frame when the current frame is the video segment boundary frame; and
   processing the current frame by removing, from the current frame, a post inserted object (PIO) included in the current frame when the image error is included in the current frame.

2. The method of claim 1, wherein the determining of whether the current frame of the stereoscopic video is the video segment boundary frame includes determining whether the current frame of the stereoscopic video is the video segment boundary frame based on a degree of change in one or more image features between the current frame and a previous frame.

3. The method of claim 2, wherein the degree of change in the one or more image features is determined based on a first feature vector including at least one of a movement, a color, or a brightness of the current frame and a second feature vector of the previous frame.

4. The method of claim 1, wherein the determining of whether the image error is included in the current frame includes:
   generating a distribution histogram based on depth map information of a left image and a right image of the current frame; and
   determining that a stereoscopic disparity is included in the current frame when a peak value of the distribution histogram is greater than a threshold.

5. The method of claim 1, wherein the processing further includes:
   rectifying the current frame from which the PIO is removed; and
   inserting the removed PIO into the rectified current frame.

6. The method of claim 5, wherein the removing the PIO from the current frame includes:
   determining a type of the PIO included in the current frame; and
   setting an edge of the PIO in the stereoscopic video based on the determined type.

7. The method of claim 5, wherein the inserting the removed PIO into the rectified current frame includes:
   inserting the PIO at an original location of the PIO in the current frame from which the PIO was removed.

8. The method of claim 1, wherein the processing further includes filling a region from which the PIO is removed in the current frame.

9. The method of claim 8, wherein the filling of the region from which the PIO is removed in the current frame includes:
   performing traverse-processing on a pixel included in the region based on a color value of a pixel not included in the region among pixels located around the region.

10. A method of processing a stereoscopic video, the method comprising:
- determining whether a post-inserted object (PIO) is present in a current frame of a stereoscopic video according to whether the current frame of the stereoscopic video is a video segment boundary frame;
- removing the PIO from the current frame when the PIO is present in the current frame;
- rectifying the current frame from which the PIO is removed; and
- inserting the removed PIO into the rectified current frame.

11. The method of claim 10, wherein the determining of whether the PIO is present in the current frame of the stereoscopic video is performed when,
- an image error is included in the current frame.

12. The method of claim 10, wherein the removing the PIO from the current frame when the PIO is determined to be present in the current frame includes:
- determining a type of the PIO present in the current frame; and
- setting a boundary of the PIO in the current frame based on the determined type.

13. The method of claim 10, wherein the removing the PIO from the current frame when the PIO is determined to be present in the current frame includes:
- determining whether the PIO determined to be present in the current frame is a text-type PIO by performing X-directional and Y-directional projection analysis on the current frame; and
- when the PIO determined to be present in the current frame is determined to be a text-type PIO,
  - measuring a depth of the PIO determined to be present in the current frame,
  - removing the PIO determined to be present in the current frame based on the measured depth, when the PIO determined to be present in the current frame is not included in a foreground,
  - extracting a color of a remaining text-type PIO based on a color distribution histogram of the current frame, and
  - removing the remaining text-type PIO based on the extracted color.

14. The method of claim 13, wherein the determining whether the PIO determined to be present in the current frame is a text-type PIO by performing X-directional and Y-directional projection analysis on the current frame includes:
- calculating an edge strength value of the PIO determined to be present in the current frame;
- setting the calculated edge strength value to be zero when the calculated edge strength value is less than a threshold; and
- determining a location of the PIO determined to be present in the current frame based on the set edge strength value.

15. The method of claim 13, wherein the determining whether the PIO determined to be present in the current frame is a text-type PIO by performing X-directional and Y-directional projection analysis on the current frame includes:
- extracting a cut-off edge of the PIO determined to be present in the current frame;
- calculating a horizontal projection value and a vertical projection value of the extracted cut-off edge;
- acquiring upper and lower boundaries of the PIO determined to be present in the current frame based on the calculated horizontal projection value;
- acquiring left and right boundaries of the PIO determined to be present in the current frame based on the calculated vertical projection value; and
- adjusting a location of the PIO determined to be present in the current frame based on the upper and lower boundaries and the left and right boundaries.

16. The method of claim 13, further comprising:
- when the PIO determined to be present in the current frame is determined to be a text-type PIO,
  - determining what type of text-type PIO the PIO determined to be present in the current frame is based on features of samples extracted from a plurality of text-type PIO samples and a plurality of non-text PIO samples; and
  - removing a region corresponding to a non-text PIO included in the PIO determined to be present in the current frame based on the determined type of text-type PIO.

17. The method of claim 10, wherein the rectifying of the current frame from which the PIO is removed includes filling a region from which the PIO is removed in the current frame.

18. The method of claim 17, wherein the filling of the region from which the PIO is removed in the current frame includes performing traverse-processing on a pixel included in the region based on a color value of a pixel not included in the region among pixels located around the region.

19. The method of claim 10, wherein the inserting the removed PIO into the rectified current frame includes inserting the PIO at an original location of the PIO in the current frame from which the PIO is removed.

20. An apparatus for processing a stereoscopic video, the apparatus comprising:
- memory storing computer-executable instructions; and
- one or more processors configured to execute the computer-executable instructions such that the one or more processors are configured to,
  - determine whether a post inserted object (PIO) is present in a current frame of a stereoscopic video according to whether the current frame of the stereoscopic video is a video segment boundary frame and remove the PIO from the current frame when the PIO is determined to be present in the current frame;
  - rectify the current frame from which the PIO is removed; and
  - insert the removed PIO into the rectified current frame.

* * * * *